United States Patent
Kamamoto

(10) Patent No.: US 8,141,402 B2
(45) Date of Patent: Mar. 27, 2012

(54) PRETENSION LOADING METHOD FOR POWER TRANSMISSION CHAIN AND PRETENSION LOADING APPARATUS

(75) Inventor: Shigeo Kamamoto, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 642 days.

(21) Appl. No.: 12/010,709

(22) Filed: Jan. 29, 2008

(65) Prior Publication Data

US 2008/0234081 A1    Sep. 25, 2008

(30) Foreign Application Priority Data

Jan. 30, 2007  (JP) ............................... P2007-019303

(51) Int. Cl.
B21D 15/00 (2006.01)
(52) U.S. Cl. .............................. 72/111; 72/11.4; 72/378
(58) Field of Classification Search .................. 72/11.1, 72/11.4, 12.3, 31.08, 107, 110, 111, 205, 72/378; 59/6, 8, 29; 474/229; 198/810.04, 198/813, 816
See application file for complete search history.

(56) References Cited

U.S. PATENT DOCUMENTS

| | | | |
|---|---|---|---|
| 5,641,058 A | | 6/1997 | Merten et al. |
| 5,728,021 A | * | 3/1998 | van Rooij et al. ............ 474/229 |
| 5,996,387 A | * | 12/1999 | Williams ........................ 72/111 |
| 6,318,140 B1 | * | 11/2001 | Yamagishi et al. ............ 72/110 |
| 6,824,484 B2 | * | 11/2004 | Greiter .......................... 474/201 |
| 6,843,090 B2 | * | 1/2005 | Sato et al. ....................... 72/110 |
| 6,854,310 B2 | * | 2/2005 | Narusaki et al. ................ 72/110 |
| 7,013,691 B2 | * | 3/2006 | Shimoda ......................... 72/110 |
| 7,328,597 B2 | * | 2/2008 | Watabe et al. .................. 72/111 |

(Continued)

FOREIGN PATENT DOCUMENTS

EP   1721686 (A1)   11/2006

(Continued)

OTHER PUBLICATIONS

Japanese Office Action dated Jul. 19, 2011 with English translation thereof.

*Primary Examiner* — Edward Tolan
(74) *Attorney, Agent, or Firm* — McGinn IP Law Group, PLLC

(57) ABSTRACT

There is provided a pretension loading method for a power transmission chain, in which a chain with an endless loop shape having a plurality of laminated link plates bendably connected to each other by pin members is wound around a plurality of rollers and the chain is endlessly rotated while a load is loaded on the chain so as to load pretension on the chain, the method including the steps of: (a) maintaining the chain in a substantial tension state without a slack by controlling tension of at least one of the plurality of rollers while endlessly rotating the chain; (b) measuring a length of the chain in the tension state; (c) stretching the chain to a target length by controlling a displacement of the at least one of the rollers; (d) maintaining the chain in a substantial tension state without a slack by controlling tension of the at least one of the rollers; and (e) measuring the length of the chain in the tension state. At this time, the steps (c) to (e) are repeated until a difference between the target length and the length of the chain which is measured in the step (e) is less than a predetermined value.

10 Claims, 7 Drawing Sheets

U.S. PATENT DOCUMENTS

2006/0254248 A1 * 11/2006 van Rooij et al. .................. 59/6

FOREIGN PATENT DOCUMENTS

| JP | 8-74938 | 3/1996 |
| JP | 11-201238 | 7/1999 |
| JP | 11-290971 (A) | 10/1999 |
| JP | A-2004-17110 | 1/2004 |
| JP | 2004-239769 (A) | 8/2004 |
| JP | 2006-102784 | 4/2006 |
| JP | 2006-317001 (A) | 11/2006 |
| JP | 2007-211914 | 8/2007 |

* cited by examiner

PRETENSION LOADING METHOD FOR POWER TRANSMISSION CHAIN AND PRETENSION LOADING APPARATUS

BACKGROUND OF THE INVENTION

1. Field of the Invention

The present invention relates to a pretension loading method for a power transmission chain used in a power transmission apparatus such as a chain type continuously variable transmission that is applied to a vehicle etc. and a pretension loading apparatus that is used for the method.

2. Related Art

As a continuously variable transmission (CVT) of an automobile, for example, there is a known continuously variable transmission including an input pulley which is disposed in an engine, an output pulley which is disposed in a drive wheel, and a power transmission chain with a continuous shape which is wound around both the pulleys. In the power transmission chain, a pin and a strip serving as pin members are inserted through a pin hole disposed in a link plate. At this time, sheave surfaces with a conical shape of both the pulleys come into contact with, for example, a pin end surface of the chain to thereby generate a friction force, so that a power is transmitted by the friction force.

At the time of manufacturing a power transmission chain including the link plate and the pin members, a plurality of link plates having a pair of pin holes are laminated so that the pin holes communicate with each other. Subsequently, the pin is inserted through the communicating pin holes, so that the plurality of link plates are bendably connected to each other to thereby configure a chain with an endless loop shape. Subsequently, pretension is loaded on the chain with an endless loop shape, so that the length or the pitch of the chain made uniform (for example, see JP-A-8-74938 and JP-A-11-201238).

In order to load pretension on the chain with an endless loop shape described above, generally, the chain is wound around two rollers which are disposed at a predetermined gap therebetween, and then the rollers endlessly rotate the chain so as to load a tensile load thereon. An example of chain deformation due to the load tension includes an elastic deformation and a plastic deformation. In general, the tensile load is controlled to be a predetermined value on the basis of the magnitude of the tensile load as a reference, so as to load pretension on the chain. For this reason, it takes time to obtain a standard length of chain.

SUMMARY OF THE INVENTION

The invention is contrived in consideration of the above-described problems, and an object of the invention is to provide a pretension loading method for a power transmission chain capable of easily obtaining a standard length of chain of which durability is improved by residual stress, and a pretension loading apparatus.

According to an aspect of the invention, there is provided a pretension loading method for a power transmission chain, in which a chain with an endless loop shape having a plurality of laminated link plates bendably connected to each other by pin members is wound around a plurality of rollers and the chain is endlessly rotated while a load is loaded on the chain so as to load pretension on the chain, the method including the steps of:

(a) maintaining the chain in a substantial tension state without a slack by controlling tension of at least one of the plurality of rollers while endlessly rotating the chain;

(b) measuring a length of the chain in the tension state;

(c) stretching the chain to a target length by controlling a displacement of the at least one of the rollers;

(d) maintaining the chain in a substantial tension state without a slack by controlling tension of the at least one of the rollers; and (e) measuring the length of the chain in the tension state, wherein the steps (c) to (e) are repeated until a difference between the target length and the length of the chain which is measured in the step (e) is less than a predetermined value.

In the pretension loading method for the power transmission chain according to the invention, the chain is maintained in the substantial tension state without a slack by controlling the tension of the roller, and then the length (original length) of the chain in the tension state is measured. Subsequently, the chain is stretched to the target length by controlling the displacement of the roller. Subsequently, the chain is maintained in the substantial tension state by controlling the tension of the roller again, and then the length of the chain in the tension state is measured. In this way, the operations for stretching the chain to the target length by controlling the displacement of the roller is repeated until the difference is less than a predetermined value on the basis of the comparison result between the target length and the length of the chain after the stretching operation. Accordingly, it is possible to easily and securely obtain a target length (standard length) of chain.

In the pretension loading method according to the invention, the original length is measured in the state where the chain is in the tension state by controlling the tension of the roller (load control). Meanwhile, the chain is stretched to the target length while loading pretension on the chain in terms of a control of the displacement of the roller (displacement control). As a result, residual stress is applied to the chain so that durability of the chain is improved and a standard length of chain can be easily and securely obtained. Thus, it is possible to remarkably improve the yield of the chain. Further, since the operation is simplified and the yield is improved, it is possible to reduce a manufacture cost of the chain.

According to another aspect of the invention, there is provided a pretension loading apparatus which endlessly rotates a chain with an endless loop shape having a plurality of laminated link plates bendably connected to each other by pin members while loading a tensile load on the chain so as to load pretension on the chain, the apparatus including a main body which has a plurality of rollers around which the chain is wound, and which supports the rollers to be rotatable and allows at least one of the plurality of rollers to be movable; a roller drive unit which moves the at least one of the rollers; a displacement sensor which measures a displacement of the at least one of the rollers; and a control unit which controls the roller drive unit so that a length of the chain becomes a target length on the basis of a measurement value of the displacement sensor.

By using the pretension loading apparatus according to the invention, it is possible to appropriately carry out the pretension loading method described above. As a result, residual stress is applied to the chain so that durability of the chain is improved and a standard length of chain can be easily and securely obtained. Thus, it is possible to remarkably improve the yield of the chain.

In the pretension loading apparatus having the above-described configuration, the plurality of rollers may have a peripheral groove on the outer periphery thereof for winding the chain therearound, and a guide surface which prevents an engagement of the chain may be formed in both sides in an axial direction of a chain hold region in the peripheral groove of at least the movable roller of the plurality of rollers. In this case, since the guide surface is formed in opposite sides in the axial direction of the chain hold region of the peripheral groove of the roller, it is possible to securely guide the chain, on which pretension is loaded, to the chain hold region of the peripheral groove, and to prevent the chain from engaging with a roller portion other than the chain hold region.

According to the pretension loading method for the power transmission chain and the pretension loading apparatus related to the invention, it is possible to easily obtain a standard length of chain of which durability is improved by residual stress.

DETAILED DESCRIPTION OF THE PREFERRED EMBODIMENTS

Hereinafter, a pretension loading method for a power transmission chain and a pretension loading apparatus according to an exemplary embodiment of the invention will be described in detail with reference to the accompanying drawings.

Figure 1:
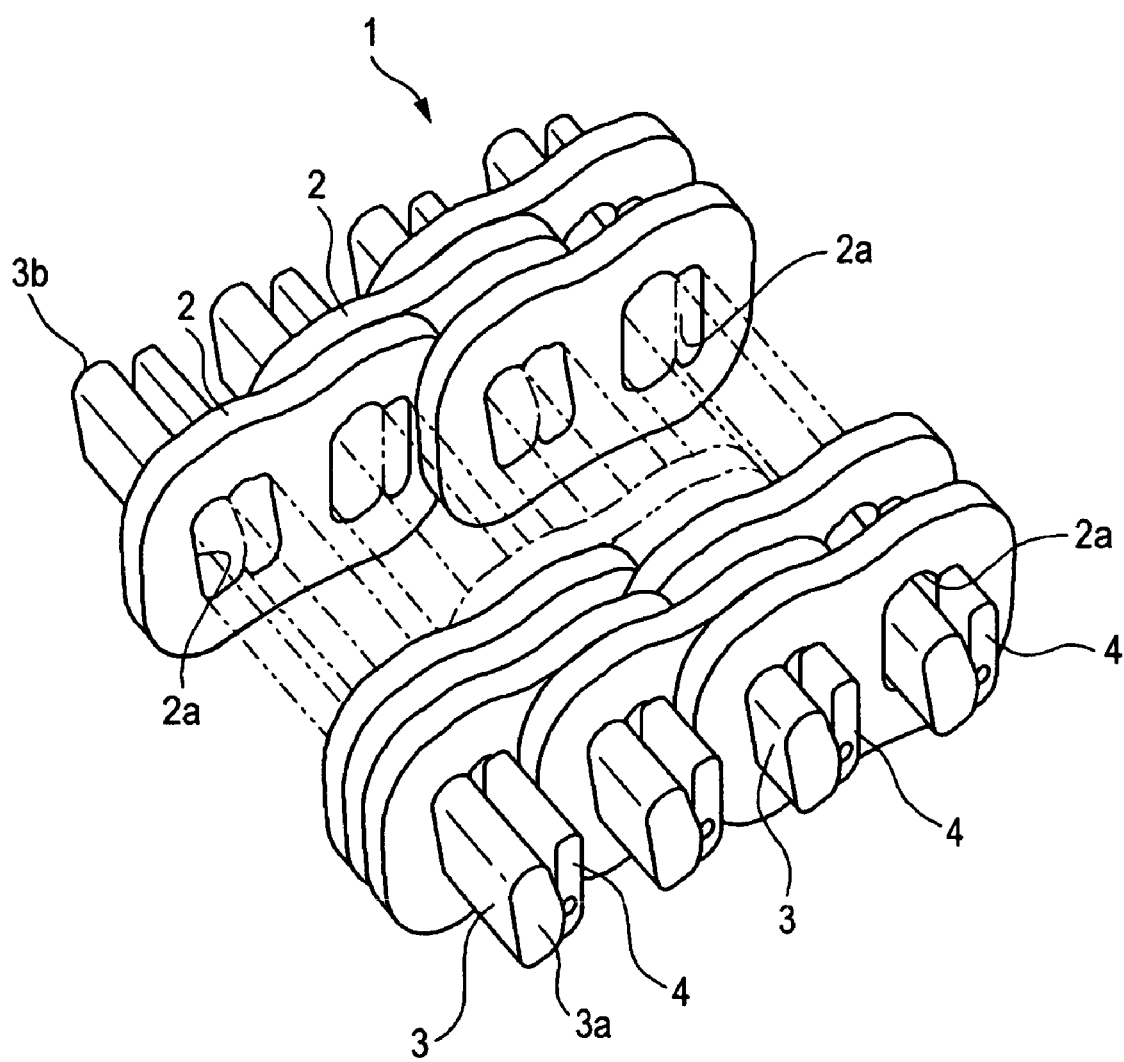
FIG. 1 is a perspective view schematically illustrating a configuration of a main part of a power transmission chain.
Figure 2:
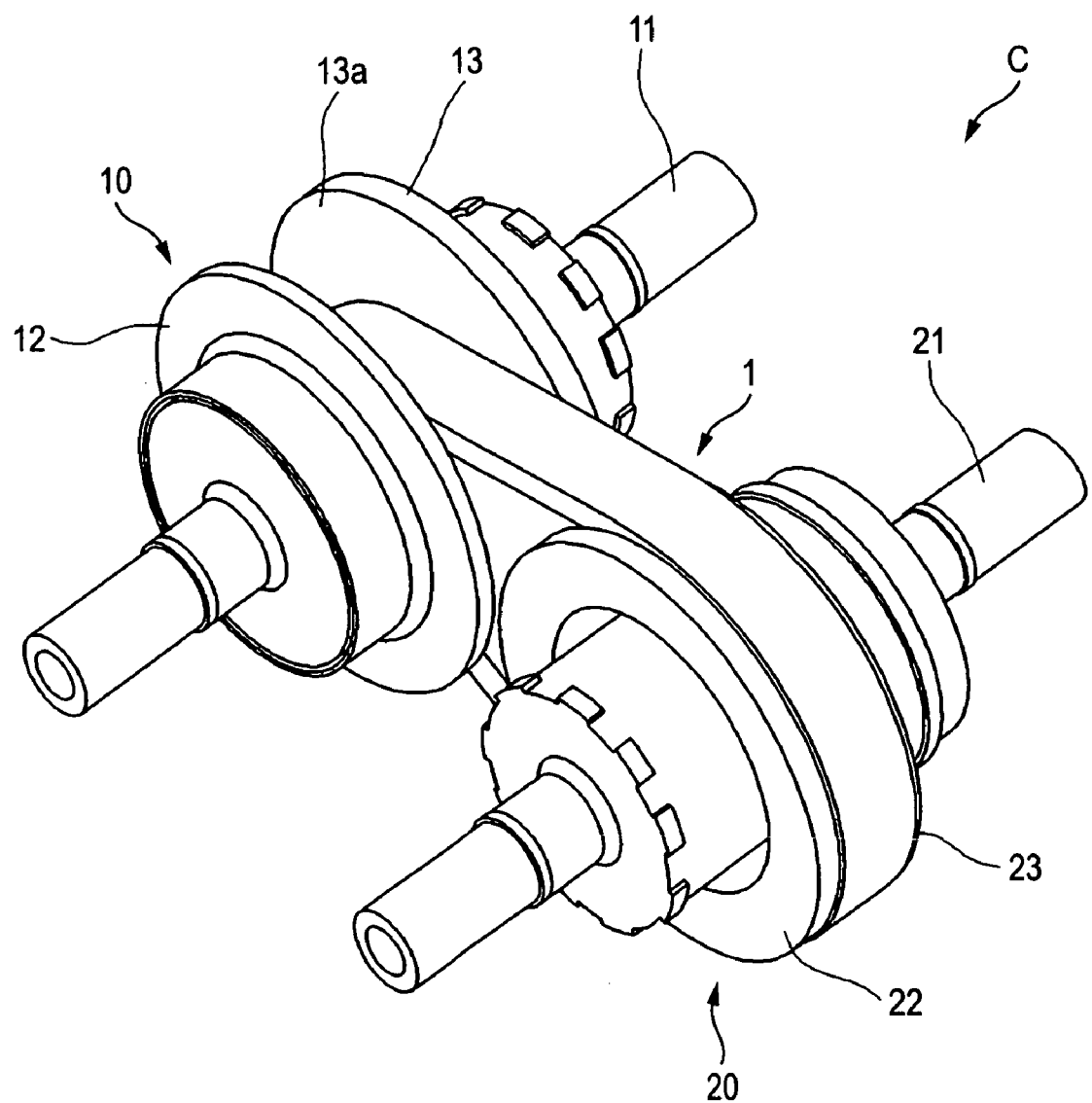
FIG. 2 is a perspective view illustrating a state where the power transmission chain is wound around an input pulley and an output pulley.
Figure 3:
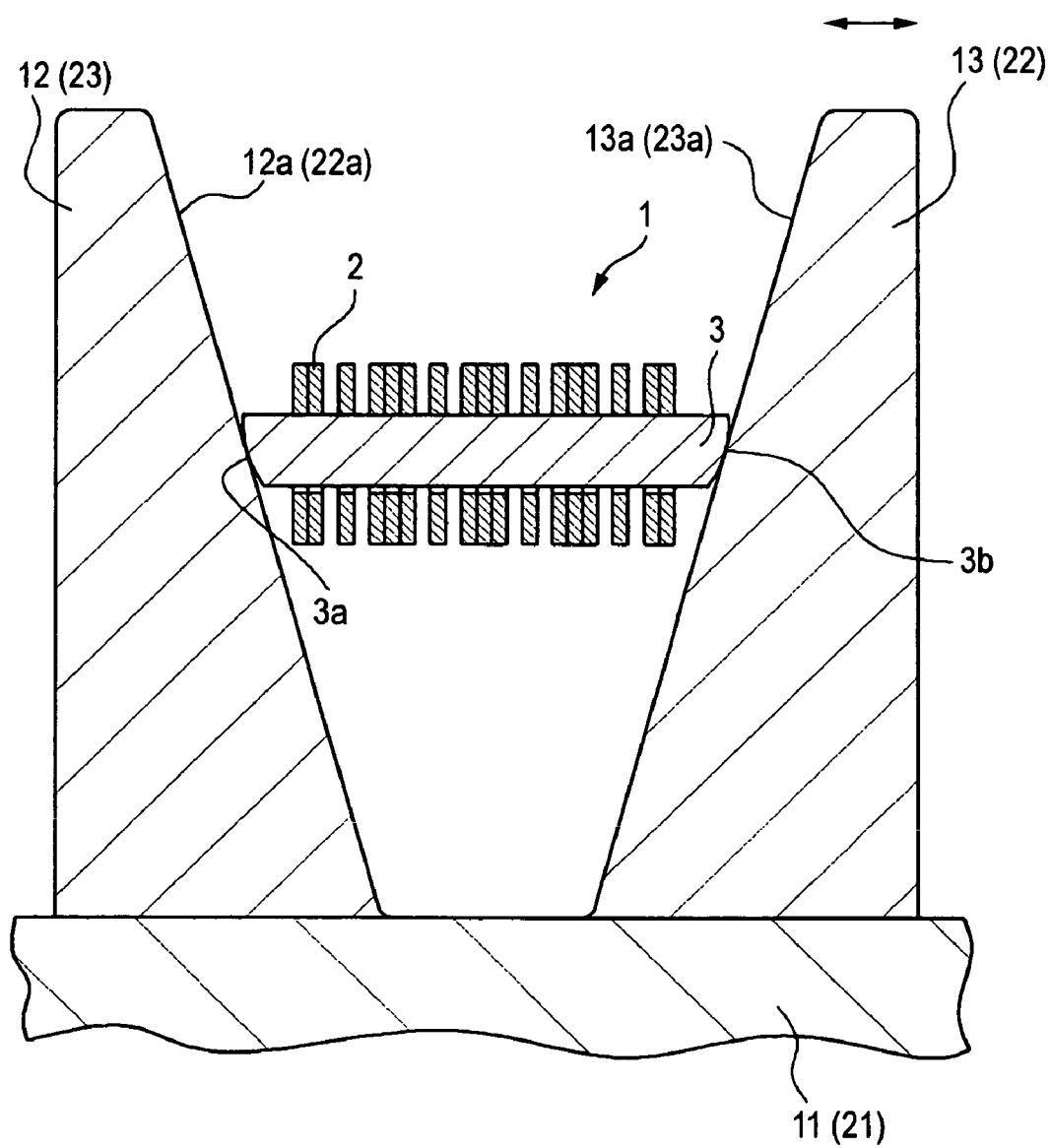
FIG. 3 is a sectional view illustrating a configuration of a main part of the power transmission chain that is wound around the input pulley.

FIG. 1 illustrates an exemplary power transmission chain 1 (hereinafter, simply referred to as "chain") on which pretension is loaded by a pretension loading method according to the invention. FIGS. 2 and 3 illustrate a usage state where the chain 1 is mounted to a chain type continuously variable transmission C (hereinafter, simply referred to as "continuously variable transmission"). The continuously variable transmission C is mounted to, for example, an automobile, and includes an input pulley 10 which is made of metal (structural steel etc.) serving as a first pulley, an output pulley 20 which is made of metal (structural steel etc.) serving as a second pulley, and the chain 1 which is wound around the pulleys.

The input pulley 10 is attached to an input shaft 11 which is connected to the engine so as to be integrally rotatable, and includes a stationary sheave 12 which has a slope surface 12a with a conical shape, and a movable sheave 13 which has a slope surface 13a with a conical shape and which is disposed so as to be opposed to the slope surface 12a. Additionally, the slope surfaces 12a and 13a of the sheaves configure a V-shape groove, and the chain 1 is forcedly fitted to the groove to be thereby held therein. The movable sheave 13 is connected to a hydraulic actuator (not shown) for changing a groove width. The hydraulic actuator moves the movable sheave 13 at the time of changing the speed to change the groove width. Accordingly, it is possible to change the wound radius of the chain 1 with respect to the input shaft 11 by moving the chain 1.

Meanwhile, the output pulley 20 is attached to an output shaft 21 which is connected to the drive wheel so as to be rotatable together. At this time, in the same manner as the input pulley 10, the output pulley 20 includes a stationary sheave 23 and a movable sheave 22 which have a slope surface for forming a groove to which the chain 1 is forcedly fitted. Additionally, in the same manner as the movable sheave 13 of the input pulley 10, the movable sheave 22 of the output pulley 20 is connected to a hydraulic actuator (not shown). The hydraulic actuator moves the movable sheave 13 in the axial direction at the time of changing the speed to change the groove width. Accordingly, it is possible to change the wound radius of the chain 1 with respect to the output shaft 21 by moving the chain 1.

In the continuously variable transmission C with such a configuration, it is possible to carry out a continuous speed change as follows. That is, at the time of decelerating the rotation of the output shaft 21, the groove width of the input pulley 10 is enlarged by the movement of the movable sheave 13. Subsequently, end surfaces 3a and 3b of the chain 1 come into sliding contact with the sheave surfaces 12a and 13a with a conical shape in the inside direction thereof under a boundary lubricated condition so as to decrease the wound diameter of the chain 1 with respect to the input shaft 11. Meanwhile, the groove width of the output pulley 20 is reduced by the movement of the movable sheave 22. Subsequently, the end surfaces 3a and 3b of the chain 1 come into sliding contact with the sheave surfaces 22a and 23a with a conical shape in the outside direction thereof under a boundary lubricated condition so as to increase the wound diameter of the chain 1 with respect to the output shaft 21. In this way, it is possible to decelerate the rotation of the output shaft 21.

On the other hand, at the time of accelerating the rotation of the output shaft 21, the groove width of the input pulley 10 is reduced by the movement of the movable sheave 13. Subsequently, the end surfaces 3a and 3b of the chain 1 come into sliding contact with the sheave surfaces 12a and 13a with a conical shape in the outside direction under a boundary lubricated condition so as to increase the wound diameter of the chain 1 with respect to the input shaft 11. Meanwhile, the groove width of the output pulley 20 is enlarged by the movement of the movable sheave 22. Subsequently, the end surfaces 3a and 3b of the chain 1 come into sliding contact with the sheave surfaces 22a and 23a with a conical shape in the inside direction thereof under a boundary lubricated condition so as to decrease the wound diameter of the chain 1 with respect to the output shaft 21. In this way, it is possible to accelerate the rotation of the output shaft 21.

The chain 1 which is wound around the input pulley 10 and the output pulley 20 will be described. The chain 1 includes a link plate 2 which serves as a chain member and which is made of a plurality of metals (carbon steel etc.), a pin (called a first pin) 3 which serves as a pin member for connecting the link plate 2 to each other and which is made of a plurality of metals (bearing steel etc.), and a strip (called a second pin or an interpiece) 4 which serves as a pin member shorter than the pin 3. In FIG. 1, a description of the center portion in the width direction of the chain 1 is partially omitted.

The link plate 2 has a visible outline with a gentle curve shape, and has two pin holes 2a for each sheet thereof. At this time, all of the link plates 2 are formed in the substantially identical shape. The pin 3 is a bar-like member which connects the link plate 2 and has a side surface following the inner peripheral surface of the pin hole 2a, and all of the pins 3 are formed in the substantially identical shape. The pin end surfaces 3a and 3b form a convex curved surface with a predetermined curvature, and come into contact with both the pulleys 10 and 20 to thereby transmit a power. The strip 4 is a bar-like member which is shorter than the pin 3 and which has a side surface following the inner peripheral surface of the pin hole 2a, and all of the strips 4 are formed in the substantially identical shape. Additionally, the pin 3 and the strip 4 are inserted through the pin holes 2a of the link plates 2 which are arranged to overlap with each other, so that the link plates 2 are bendably connected to each other.

In the pin 3 and the strip 4 which are inserted through one pin hole 2a, one of them is press-fitted to the pin hole 2a and the other of them is inserted therethrough so as to be rotatable while coming into rolling contact with the side surface of one of them. The other of them is press-fitted to the pin hole 2a of the other link plate 2 which is adjacent to one link plate 2, and one of them is inserted through the pin hole 2a of the other link plate 2 so as to be rotatable. In this manner, one of the pin 3 and the strip 4 is press-fitted to the pin hole 2a, and the other of them is inserted through the pin hole 2a so as to be rotatable, so that the link plates 2 are bendably connected to each other. As described above, the overlapping link plates 2 are bendably connected to each other and are laminated, so as to configure the bendable chain 1.

Since each of the link plates 2 configuring the chain 1 has a machining tolerance, when the length and pitch of the manufactured chain 1 are not uniform, a problem arises in that quality is not uniform and a force that is loaded on each of the link plates 2 in use is different. For this reason, in a manufacture process, a plurality of link plates 2 are laminated and then the pin 3 and the strip 4 are inserted through the pin hole 2a so that the plurality of link plates 2 are bendably connected to each other to thereby obtain a chain 1p with an endless loop shape. Subsequently, pretension is loaded thereon.

[Pretension Loading Apparatus]

Figure 4:
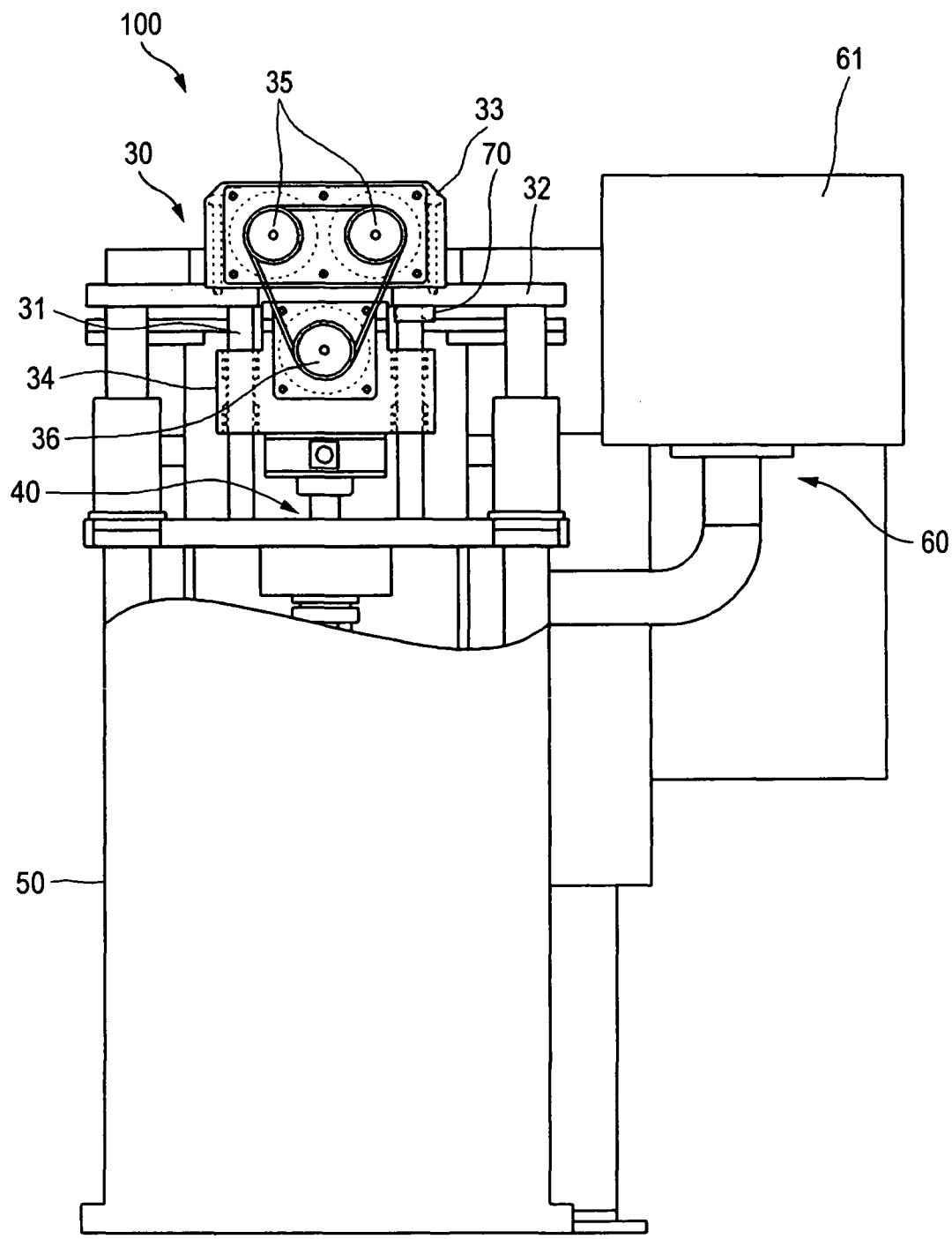
FIG. 4 is a front view illustrating a three-cylinder type pre-load apparatus.
Figure 5:
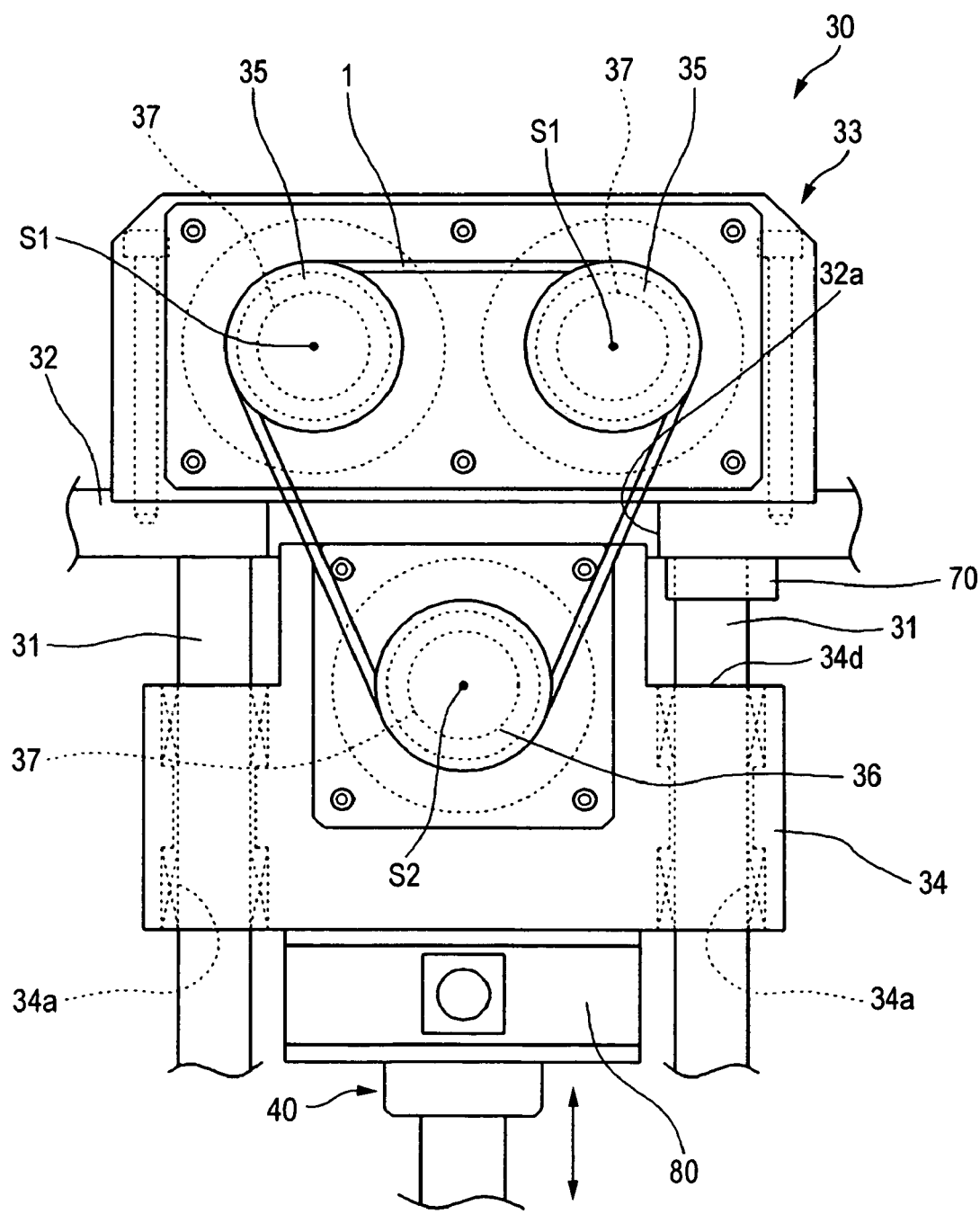
FIG. 5 is a front view illustrating a main part of the three-cylinder type pre-load apparatus.

Next, a pretension loading apparatus for loading pretension on the chain 1p will be described. FIG. 4 illustrates a three-cylinder type pre-load apparatus 100 serving as a pretension loading apparatus for loading pretension on the chain 1p. The apparatus 100 includes a main body 30, a hydraulic device 40 (roller drive unit) which is disposed in the lower side of the main body 30, a pedestal unit 50, and a control device 60 which is disposed in the side of the main body 30. As shown in FIG. 5, the main body 30 includes a guide post 31 which erects on the left and right sides of the pedestal 50; a stationary support plate 32 which is disposed in the upper end of the guide post 31; a fixation portion 33 which is fixed to the stationary support plate 32; an elevation portion 34 which is disposed in the lower side of the fixation portion 33; two upper rollers 35 which are disposed in the fixation portion 33; and a lower roller 36 which is disposed in the elevation portion 34. Two upper rollers 35 are supported at the same height position, and the lower roller 36 is supported at a position below the center portion between the two upper rollers 35. The upper rollers 35 and the lower roller 36 are arranged in a substantially triangular shape when the chain 1p wound around the rollers 35 and 36 is viewed from the front side.

An insertion through-hole 34a is formed in both sides of the elevation portion 34, and the guide post 31 is inserted through the insertion through-hole 34a so that the elevation portion 34 can move vertically close or away to or from the fixation portion 33. Accordingly, the hydraulic device 40 which is disposed in the lower side of the elevation portion 34 elevates the elevation portion 34 in the up/down direction (inside/outside direction of the triangle), and thus a distance between the upper rollers 35 disposed in the fixation portion 33 and the lower roller 36 disposed in the elevation portion 34 varies. An introduction port 32a is formed in the center portion of the stationary support plate 32, and when the elevation portion 34 is lifted up, the upper portion thereof is configured to enter the introduction port 32a.

The control device 60 controls the hydraulic device 40 and a roller drive mechanism described below to elevate the lower roller 36 and rotate the lower roller 35. Additionally, a control panel 61 of the control device 60 is provided with a button for driving or stopping the hydraulic device 40 and the roller drive mechanism, a rotation speed display portion of the upper rollers 35 and the lower roller 36, an input portion for inputting a displacement amount (an amount which corresponds to a target length of the chain) to displace the lower roller 36, and a display portion for displaying the displacement amount.

A laser type displacement sensor 70 is fixed to the right lower surface of the stationary support plate 32. The displacement sensor 70 senses a distance of a right step surface 34d of the elevation portion 34 so as to measure the displacement amount of the lower roller 36. At this time, displacement data which is output from the displacement sensor 70 is transmitted to the control device 60.

A memory of the control device 60 stores a relational expression between the displacement amount of the lower roller 36 which is detected by the displacement sensor 70 and the length for each type of the chain 1. Accordingly, when the chain 1p needs to be stretched to a standard length (target length) which is stipulated for each type of the chain 1p in the state where the chain 1p is wound around the rollers 35 and 36, if the standard length is input to the input portion of the control panel 61, the control device 60 controls the hydraulic device 40 to lift down the lower roller 36 by a displacement amount which corresponds to the standard length.

Additionally, a load sensor 80 is disposed between the elevation portion 34 and the hydraulic device 40, and detects a load applied to the lower roller 36 at the time the lower roller 36 is displaced. Load data which is output from the load sensor 80 is transmitted to the control device 60. The control device 60 recognizes a load (tension) loaded on the chain 1 on the basis of the load data. When the chain 1 is in a substantially tension state without a slack in order to measure an original length of the chain 1, if a load value which is determined in advance by an experiment etc. is input to the input portion of the control device 60, the control device 60 controls the hydraulic device 40 to lift down the lower roller 36 until a desired load is loaded on the chain 1.

Figure 6:
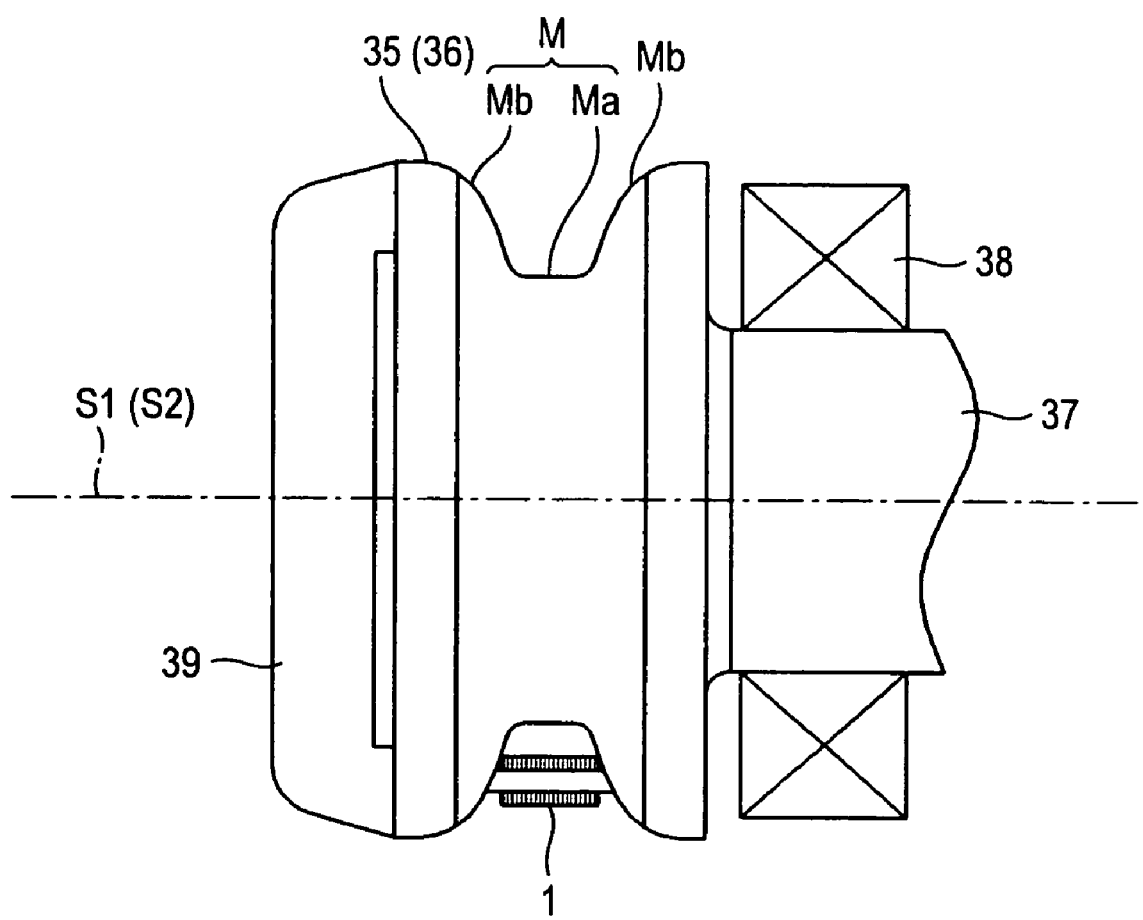
FIG. 6 is a sectional view illustrating the vicinity of an upper roller and a lower roller.

As shown in FIG. 6, the upper rollers 35 and the lower roller 36 are integrally formed with the front ends of support shafts 37. Each of the support shafts 37 is supported by a bearing 38 so as to be rotatable in the fixation portion 33 and the elevation portion 34. Accordingly, each of the upper rollers 35 and the lower roller 36 is supported in a cantilever shape so as to be rotatable about axial lines s1 and s2. Additionally, the roller drive mechanism (not shown) is disposed in the fixation portion 33, and rotates the upper rollers 35. A guide cap 39 is disposed in the front ends of the upper rollers 35 and the lower roller 36 so as to facilitate a mounting operation of the chain 1p.

In the outer peripheral portions of the upper rollers 35 and the lower roller 36, there is provided a peripheral groove M with a substantially U shape around which the chain 1 is wound. The peripheral groove M includes a chain hold region Ma which holds the chain 1 in the vicinity of a groove bottom of the peripheral groove M and a guide surface Mb which is formed in both sides (both left and right sides in FIG. 6) of the axial direction of the chain hold region Ma and which is curved in a convex shape. Since the guide surface Mb is formed in this way, it is possible to securely guide the chain 1p, on which pretension is loaded, to the chain hold region Ma of the peripheral groove M, and to prevent the chain 1p from engaging with a roller portion other than the chain hold region Ma. Additionally, the guide surface Mb is normally formed in the lower roller 36 which is a movable roller. However, when the guide surface Mb is formed in the upper rollers 35 in the same manner as the embodiment, it is possible to more securely prevent the chain 1p from engaging with other portion.

[Pretension Loading Method]

Figure 7:
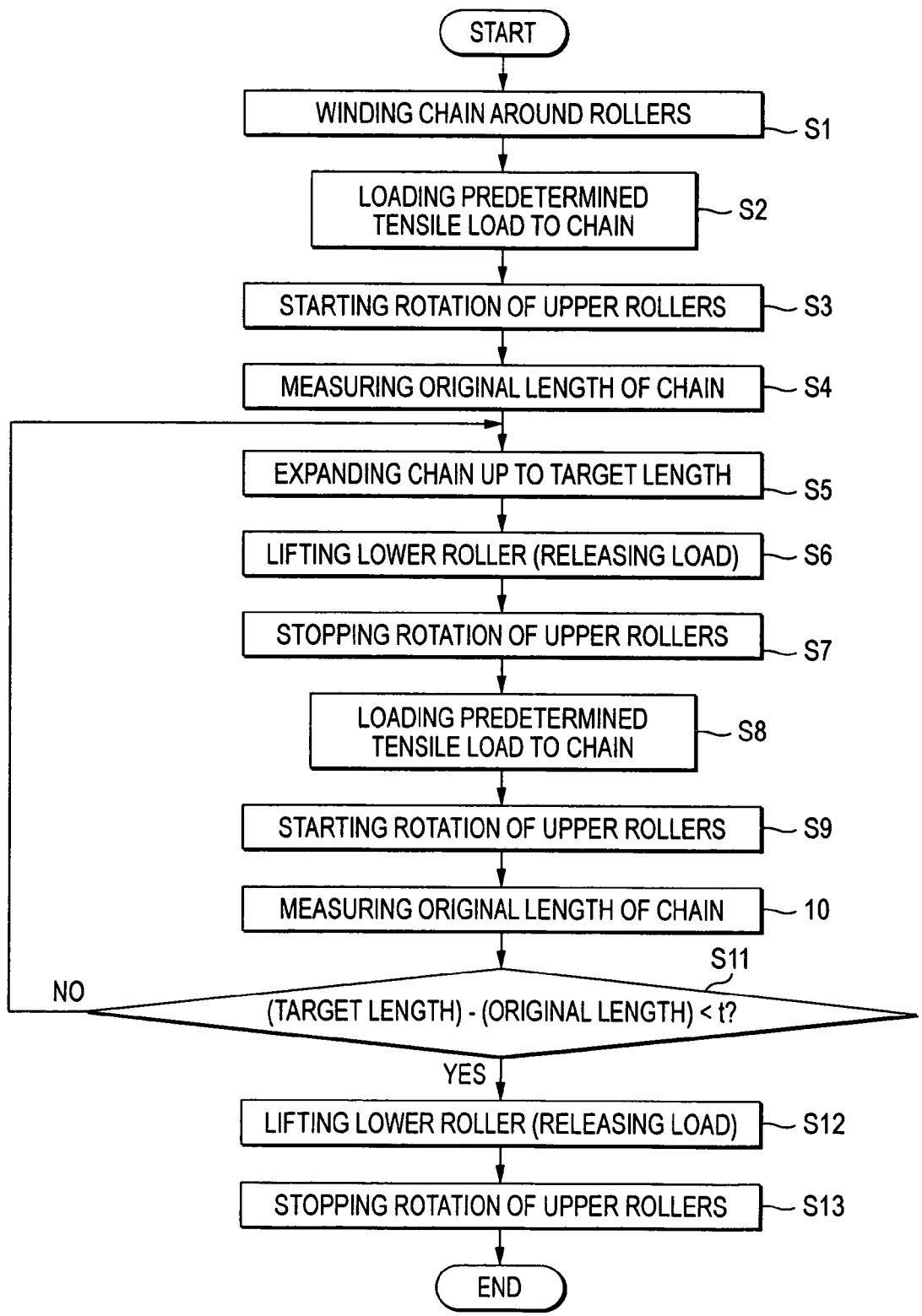
FIG. 7 is a flowchart illustrating a pretension loading method according to an exemplary embodiment of the invention.

Next, a pretension loading method for the chain 1p using the three-cylinder pre-load apparatus 100 described above will be described with reference to the flowchart shown in FIG. 7. In order to maintain the chain 1p in the substantially tension state without a slack to measure an original length and a target length of the chain 1p which is stretched by the loaded pretension, the load (tension) to be loaded on the chain 1p needs to be preliminarily input to the input portion of the control device 60.

First, the elevation portion 34 and the lower roller 36 are lifted up so as to return to an initial position, and in the initial position, the chain 1p is inserted into the peripheral grooves M of the two upper rollers 35 and the lower roller 36 to be thereby wound therearound (step s1). At this time, since the guide caps 39 are provided in the rollers 35 and 36, it is possible to easily mount the chain 1p thereto, Additionally, since the guide surface Mb is formed in the peripheral groove M, it is possible to securely guide the chain 1p to the chain hold region Ma of the peripheral groove M, and to prevent the chain 1p from engaging with a roller portion other than the chain hold region Ma. Further, the returning operation in which the lower roller 36 returns to the initial position may be configured to be automatically set at the end of a series of pretension loading operation.

Subsequently, the lower roller 36 is lifted down until a predetermined tensile load (for example, 20 to 40 kN) acts on the chain 1p (step S2). Subsequently, a rotation of the upper rollers 35 is started (step S3). Subsequently, the rollers are rotated in the range of 5 to 1,000 rpm and the chain 1p is rotated 1 to 20 times, so that the chain 1p is securely settled on the chain hold region Ma of the peripheral groove M of the rollers 35 and 36 and then the original length of the chain 1p is measured (step S4). The measurement of the original length can be carried out by the displacement sensor 70.

Subsequently, the lower roller 36 is lifted down until the length of the chain 1p becomes a predetermined target length while the rollers 35 and 36 are rotated, and pretension is loaded on the chain 1p so as to plastic deform the chain 1p (step S5). Then, the chain is rotated 1 to 20 times under such a state in order to uniformly load pretension on the members configuring the chain.

Subsequently, the lower roller 36 is lifted up until the tension acting on the lower roller 36 becomes zero, and the wound state of the chain 1 on the lower roller 36 is completely released (step S6). Subsequently, the rotation of the upper rollers 35 is stopped (step S7).

Subsequently, after the rotation of the rollers 35 and 36 is stopped, the lower roller 36 is lifted down until a predetermined tensile load (for example, 1 to 4 kN) acts on the chain 1 (step S8). Subsequently, the rotation of the upper rollers 35 is started (step S9). Susequently, the roller is rotated in the range of 1 to 2 rpm, and the chain 1 is rotated 1 to 20 times, so that the chain 1 is settled on the chain hold region Ma of the peripheral groove M and then the original length of the chain 1 is measured (step S10).

Subsequently, a processor of the control device 60 compares the target length and the original length which is measured in step S10 (step S11), and when the difference is less than a predetermined value t (for example, 0.5 mm), the lower roller 36 is lifted up until the tension acting on the lower roller 36 becomes zero so that the wound state of the chain 1 on the lower roller 36 is completely released (step S12). Subsequently, the rotation of the upper rollers 35 is stopped (step S13). Accordingly, a pretension loading operation of the chain ends.

Meanwhile, when the difference is not less than the predetermined value t, the present step returns to step S5 and the operation for stretching the chain to the target length is repeated. The stretching operation for stretching the chain to the target length is repeated until the difference is less than the predetermined value t, and generally it is possible to stretch the chain to the standard length within a predetermined tolerance by carrying out the stretching operation two or three times.

In the pretension loading method described above, the original length is measured in the state where the chain is in the tension state by controlling the tension of the roller (load control). Meanwhile, the chain is stretched to the target length while loading pretension on the chain by a control of the displacement of the roller (displacement control). As a result, residual stress is applied to the chain so that durability of the chain is improved and a standard length of chain can be easily and securely obtained. Thus, it is possible to remarkably improve the yield of the chain. Further, since the operation is simplified and the yield is improved, it is possible to reduce a manufacture cost of the chain.

In the embodiment described above, while the pretension is loaded on the chain using the pretension loading apparatus having three rollers, the pretension loading apparatus is not limited thereto, but may be a pretension loading apparatus having two rollers or a pretension loading apparatus having four rollers which are arranged in a square shape. Further, the pin member configuring the chain may be a contact member which is disposed in a pin main body and both end portions thereof. Furthermore, the chain may be a type in which all of pins or strips serving as the pin members (pin-strip, pin-pin) are not press-fitted to the link plate, a type in which the pin member is constituted by two pins and both end surfaces come into contact with the sheave surface of the pulley to transmit a power, or a block type which has a block member to which the laminated link plates are inserted.

What is claimed is:

1. A pretension loading method for a power transmission chain, in which a chain with an endless loop shape including a plurality of laminated link plates bendably connected to each other by pin members is wound around a plurality of rollers and the chain is endlessly rotated while a load is loaded on the chain so as to load pretension on the chain, the method comprising:

a first maintaining of the chain in a substantial tension state without a slack by controlling tension of at least one of the plurality of rollers while endlessly rotating the chain;

a first measuring of a length of the chain in the tension state;

plastically deforming the chain to a target length by controlling a displacement of the at least one of the rollers to a predetermined location;

a second maintaining of the chain in an other substantial tension state without a slack, the other tension state comprising a tension less than a tension required to cause plastic deformation of the chain by controlling tension of the at least one of the rollers; and a second measuring of the length of the chain in the other tension state, wherein the plastically deforming the chain, the second maintaining and the second measuring are repeated until a difference between the target length and the length of the chain which is measured in the second measuring is less than a predetermined value.

2. The method according to claim 1, further comprising:
endlessly rotating the chain during the plastically deforming the chain.

3. The method according to claim 1, further comprising:
after the plastically deforming the chain and before the second maintaining, removing the tension on the chain.

4. The method according to claim 1, further comprising:
after the plastically deforming the chain, stopping the rotating of the chain.

5. The method according to claim 1, further comprising:
during the second maintaining, endlessly rotating the chain.

6. The method according to claim 1, further comprising:
releasing the tension after the second measuring; and
stopping the endlessly rotating of the chain after the releasing of the tension.

7. A pretension loading apparatus which endlessly rotates a chain with an endless loop shape including a plurality of laminated link plates bendably connected to each other by pin members while loading a tensile load sufficient to cause plastic deformation on the chain so as to load pretension on the chain, the apparatus comprising:
a main body which includes a plurality of rollers around which the chain is wound, and which supports the rollers to be rotatable and allows at least one of the plurality of rollers to be movable;
a roller drive unit which moves the at least one of the rollers;
a displacement sensor which measures a displacement of the at least one of the rollers; and
a control unit which controls the roller drive unit so that a length of the chain is extended to a target length on the basis of a measurement value of the displacement sensor measuring the displacement of the at least one of the rollers such that the chain is extended to the target length when the tensile load is removed.

8. The pretension loading apparatus according to claim 7, wherein the plurality of rollers include a peripheral groove on the outer periphery thereof for winding the chain therearound, and
wherein a guide surface which prevents an engagement of the chain is formed in opposite sides in an axial direction of a chain hold region in the peripheral groove of at least the movable roller of the plurality of rollers.

9. The pretension loading apparatus according to claim 7, wherein the plurality of rollers include at least three rollers, such that the chain forms a substantially triangular shape when wound around the rollers and viewed from a chain width direction.

10. The pretension loading apparatus according to claim 7, further comprising:
a memory control device which stores a relational expression between a displacement amount of the at least one of the rollers and a length for a plurality of chain types.

* * * * *